Figure 1:
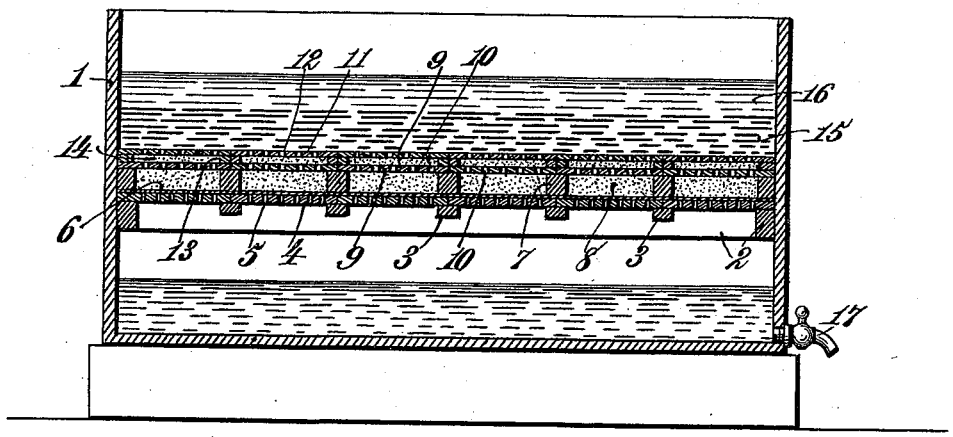

(No Model.)

F. B. STRUNZ.
LEACHING APPARATUS.

No. 527,819. Patented Oct. 23, 1894.

Witnesses:
Robert Everett
A. H. Norris

Inventor:
Frederick B. Strunz.
By James L. Norris.
Atty

UNITED STATES PATENT OFFICE.

FREDERICK B. STRUNZ, OF PITTSBURG, PENNSYLVANIA.

LEACHING APPARATUS.

SPECIFICATION forming part of Letters Patent No. 527,819, dated October 23, 1894.

Application filed January 25, 1894. Serial No. 497,990. (No model.)

*To all whom it may concern:*

Be it known that I, FREDERICK B. STRUNZ, a citizen of the United States, residing at Pittsburg, in the county of Allegheny and State of Pennsylvania, have invented new and useful Improvements in Leaching Apparatus, of which the following is a specification.

My invention relates to improvements in the leaching apparatus for which Letters Patent No. 260,714 were granted to Stephen Strunz, July 4, 1882, and it has for its objects to provide more convenient and efficient means for facilitating removal of the precipitate after it has been separated from the filtrate and without disarranging the permanent filter bed; to provide the apparatus with a more compact and evenly laid filter bed by which a uniform filtering process can be carried on; to provide for removing, cleaning and replacing an additional uppermost series of filtering plates without in any way disturbing the lower or permanent portion of the filter bed; and generally to render the apparatus more effective and durable and better suited for long continuous use.

The improved leaching apparatus comprises a tank in which, at a suitable distance from the bottom, is a horizontal frame supporting a series of closely laid perforated plates that in turn support a number of transversely arranged iron bars between which is a filling of dry sand resting on the first layer or series of perforated plates and immediately below a second layer or series of such plates that are supported by said bars; while above and resting on this second layer of plates is a third series or layer of perforated plates each of which is provided on its under side with a surrounding steel frame affording between the said second and third layers of perforated plates a series of intervening spaces that are filled in evenly and compactly with dry sand. By this construction and arrangement of parts the third or uppermost layer of perforated plates and attached frames, and also the upper layer of sand, can be readily removed whenever desired without disturbing or disarranging the permanent filter bed composed of the first and second layers of perforated plates and intervening sand; while the arrangement of the series of iron bars between the said first and second layers of perforated plates will obviously furnish a more firm and even support for the second layer of plates than would be the case if they were laid only on the sand, as in the apparatus described in the patent hereinbefore named. My improvements, therefore, provide, in a leaching apparatus, a permanent filter bed that is compactly arranged and firmly and evenly supported throughout all its parts, and which will give more uniform and satisfactory results in operation, and an upper series of framed and removably placed perforated plates that can be taken out, cleansed and replaced, without disturbing the permanent filter bed, whenever the said upper plates become clogged or whenever it is desired to renew the upper layer of sand.

My invention consists in the construction and combination of parts in a leaching apparatus as hereinafter described and claimed.

Figure 2:
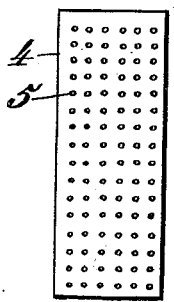
Figure 3:
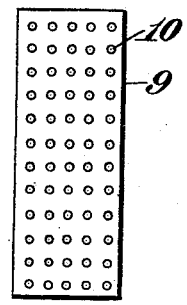
Figure 4:
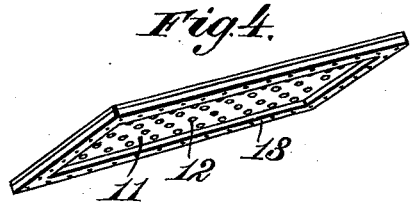

In the annexed drawings illustrating the invention, Figure 1 is a vertical longitudinal section of my improved leaching apparatus. Fig. 2 is a view of one of the perforated plates in the first or lower layer of plates. Fig. 3 is a view of one of the plates of the second layer which are the same as the first except that the perforations are larger. Fig. 4 is a view of the under side of one of the framed perforated plates in the third or upper layer.

The reference numeral 1 designates a tank constructed preferably of metal and having any suitable shape or proportions according to the scale of manufacturing operations in which it is to be used. To the inner surface of the vertical walls of this tank, at a suitable distance from the bottom, are bolted supporting strips 2 that are extended entirely around the tank. In the upper edges of the side strips 2 are mortises that receive the ends of transversely arranged slats 3 which form, with the strips 2, a supporting framework for a series of closely laid metal plates 4 each of which is provided throughout with a number of small perforations 5 placed at substantially uniform distances apart. These perforated plates 4 are of such length and width that when placed in position they will extend from side to side and from end to end of the tank, in which they are supported by the rigidly attached frame-work composed of the strips 2 and slats 3, each of the latter being so arranged as to support the meeting edges of two adjacent plates.

Upon the upper surface of the perforated plates 4 may be laid a sheet of muslin 6, or equivalent material. Over the joints of the lower set of perforated plates, and resting on the muslin sheet, are placed a number of iron bars 7 that are extended across the tank from side to side. These iron bars may be about one inch square. Between the transversely arranged iron bars 7 is spread dry sand 8 to a depth of one inch, and a second set or layer of perforated plates 9 is now laid in position with the meeting edges of the plates resting on the iron bars 7 and their lower faces in contact with the sand. These plates 9 are made of metal and perforated in the same manner as the plates of the first set except that their perforations 10 are somewhat larger.

The rigidly supported first and second layers of perforated plates 4 and 9 and the intermediate iron bars 7 and sand 8 form a permanent filter bed that will endure a long time without renewal or repairs. The iron bars 7 afford a more firm and even support for the second layer of perforated plates 9 than if they were allowed to rest on the sand alone and by this means, also, is avoided risk of disturbing the permanent filter bed when removing precipitates.

On the permanent filter bed I place a series of metal plates 11 having perforations 12 and provided each with a surrounding steel frame or downward projecting ledge 13 that may be one half an inch wide by one quarter of an inch in thickness. This frame or rim 13 is secured to the under side of each plate 11, as shown, and a number of such framed plates constitute a third set or layer that is placed directly onto the second layer, with the frames 13 downward and with a layer of dry sand 14 between the said second and third layers of perforated plates.

One mode of employing this apparatus is as follows: Soda-ash being dissolved in water and lime added to render the liquor caustic, the clear lye may be drawn off after a proper time and the remaining lime precipitate laid upon the third or uppermost layer of perforated plates 11 of the leach and be allowed to remain thereon until more lye has filtered out. Water is then poured upon the layer of lime precipitate to a depth about equal to the depth of the said layer of lime precipitate which lies upon the said perforated plates, so that as the water passes through it will carry with it any lye still adhering to the lime precipitate, leaving the latter without strength and obtaining within a short time all the lye obtainable from the materials used.

In Fig. 1, the numeral 15 designates the lime, or other precipitate and 16 the water. A discharge cock 17 is provided at a suitable point to permit withdrawal of the liquor from the lower portion of the tank.

A leaching or filtering apparatus constructed in the manner described will last several years and will serve to filter the lye resulting from one thousand tons of soda-ash without at any time disturbing the permanent filter bed.

By providing the permanent filter bed with the series of transversely arranged iron bars 7 and laying the second set of perforated metal plates 9 upon these bars with a filling of dry sand between the first and second layers of perforated plates I obtain a more durable compact, evenly arranged and uniformly acting filter bed than would be possible by resting the second layer of plates on the sand alone. Formerly it was necessary to remove the second layer of plates from time to time, whenever they became somewhat clogged by the lime precipitate working through them. This was a very tedious operation and often necessitated removal and reconstruction of the entire filter bed in order to again put the apparatus in good condition.

It is very important that the filtering or leaching process should be uniform over the entire surface of the filter bed and in order to accomplish this result it is necessary that the second layer of perforated plates should not be disturbed. This I have accomplished by firmly supporting the second layer of plates on the iron bars 7 that are embedded in the permanent filter bed and by providing a third or uppermost layer of perforated plates 11 capable of being removed and replaced without disarranging the permanent filter bed. When it becomes necessary to take out this top layer of plates 11 it can be done very quickly and easily at any time, the upper layer of sand 14 can be removed together with any precipitate that may have worked through the upper layer of plates, and the said plates being cleansed will then be replaced together with clean dry sand. This is accomplished without any disarrangement of the permanent filter bed and the entire apparatus will now be in as perfect and thoroughly effective condition as when first prepared or constructed. In an apparatus of this construction the precipitate can be conveniently removed from the surface of the filter bed after it has been separated from the filtrate and the apparatus is useful for getting a precipitate into a semi-solid condition in which it can be readily removed from the filter bed by means of a scoop or shovel.

What I claim as my invention is—

In a leaching apparatus, the combination with a tank, and a horizontal layer of perforated plates supported in said tank and covered with a layer of sand laid on a sheet of muslin or equivalent material, of a number of transversely arranged iron bars embedded in said sand layer and supporting a second layer of perforated plates, the said first and second layers of perforated plates and the intervening bars and sand layer constituting a permanent filter bed, and an uppermost removable sectional layer composed of a series of perforated plates arranged edge to edge in the same horizontal plane above the said permanent filter bed and separated therefrom by a layer of sand, substantially as described.

In testimony whereof I have hereunto set my hand and affixed my seal in presence of two subscribing witnesses.

FREDERICK B. STRUNZ. [L. S.]

Witnesses:
 H. J. WENKE,
 H. J. SCHNEIDER.